US008287040B2

(12) United States Patent
Hojnacki et al.

(10) Patent No.: US 8,287,040 B2
(45) Date of Patent: Oct. 16, 2012

(54) VEHICULAR SEAT SYSTEM AND VEHICULAR HEADREST

(75) Inventors: Henry E. Hojnacki, Sterling Heights, MI (US); George Ng, Markham (CA); Herbert Schmidt, Richmond Hill (CA)

(73) Assignee: Proprietect LP (CA)

( * ) Notice: Subject to any disclaimer, the term of this patent is extended or adjusted under 35 U.S.C. 154(b) by 0 days.

(21) Appl. No.: 12/533,532

(22) Filed: Jul. 31, 2009

(65) Prior Publication Data

US 2010/0060066 A1 Mar. 11, 2010

Related U.S. Application Data

(60) Provisional application No. 61/085,619, filed on Aug. 1, 2008.

(51) Int. Cl.
*B60N 2/42* (2006.01)
*B60R 22/28* (2006.01)

(52) U.S. Cl. .................................. 297/216.12; 297/391

(58) Field of Classification Search .................. 297/391, 297/408, 216.12, 452.18
See application file for complete search history.

(56) References Cited

U.S. PATENT DOCUMENTS

| | | | | |
|---|---|---|---|---|
| 4,120,533 | A * | 10/1978 | Harder, Jr. | 297/445.1 |
| 6,000,759 | A * | 12/1999 | Pedronno et al. | 297/391 |
| 7,144,081 | B2 * | 12/2006 | Baltzer | 297/216.12 |
| 7,152,928 | B2 * | 12/2006 | Yetukuri et al. | 297/410 |
| 7,537,282 | B2 * | 5/2009 | Veine et al. | 297/216.12 |
| 7,819,480 | B2 * | 10/2010 | Asbury et al. | 297/391 |
| 7,926,871 | B2 * | 4/2011 | Meixner et al. | 297/216.12 |
| 2005/0001463 | A1 * | 1/2005 | Yetukuri et al. | 297/391 |
| 2008/0164730 | A1 * | 7/2008 | Watson et al. | 297/216.12 |

* cited by examiner

*Primary Examiner* — Milton Nelson, Jr.
(74) *Attorney, Agent, or Firm* — Katten Muchin Rosenman LLP

(57) ABSTRACT

The invention relates to a vehicular seat system including a seat bottom and a seat back. The headrest is connected to the seat back. The headrest consists of a number of components. These components include: a non-foam frame element, a non-foam insert secured with respect to a portion of the frame element, and a resilient element in which at least a portion of the frame element and the entire insert are embedded. The resilient element consists essentially of a homogeneous foam material. The frame element comprises a pair of post elements for coupling to the vehicular seat back. The post elements are interconnected by a cross-piece element. The headrest is connected to the seat back such that the minimum distance between the outer surface of the headrest for contacting a head of an occupant and the insert is in the range of from about 10 mm to about 30 mm. The vehicular headrest useful in the present seat system is compliant with the FMVSS 202*a* backset retention requirement

32 Claims, 8 Drawing Sheets

Fig.3
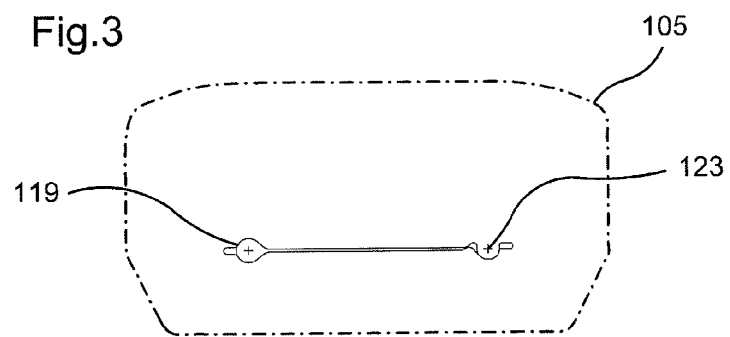
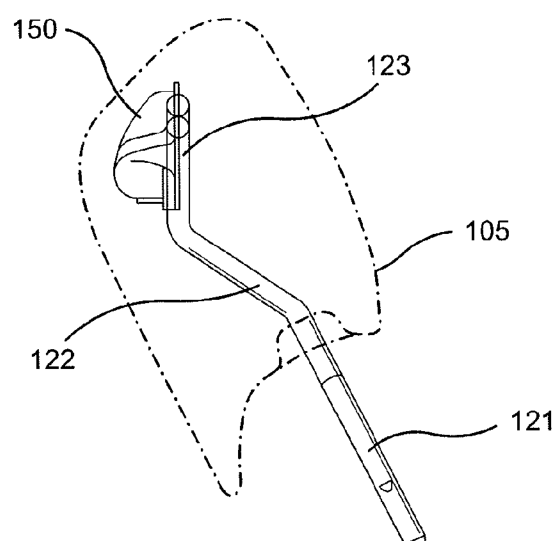
Fig.4

VEHICULAR SEAT SYSTEM AND VEHICULAR HEADREST

CROSS-REFERENCE TO RELATED APPLICATION

This application claims priority to U.S. Patent Appln. No. 61/085,619, filed Aug. 1, 2008, the contents of which are incorporated herein by reference.

BACKGROUND OF THE INVENTION

1. Field of the Invention

In one of its aspects, the present invention relates to a vehicular headrest.

2. Description of the Prior Art

Vehicular headrests are generally known.

Generally, a vehicular headrest consists of a frame element and a resilient element. The frame element serves the purpose of securing the headrest to the vehicular seat. The resilient element is secured to the frame element and is configured to function as a head restraint to cushion the head of an occupant of the seat in the event of impact. It is conventional to construct the frame element from a rigid materials such as metal and the resilient element from a softer material such as foam (e.g., polyurethane foam).

More recent approaches to the design of vehicular headrest employ an inner core material of higher hardness embedded into the head restraint and covered with conventional foam (e.g., polyurethance foam). The inner core, due to its relatively high hardness, increases the load bearing capacity of the head restraint and prevents the head of occupant from sinking or deflecting into the headrest. The action of reducing head deflection into head restraint by the inner core helps reduce the rotation of the head of the occupant relative to his/her torso during a rear end collision and therefore reducing risk of whiplash injury.

For example, U.S. Pat. No. 6,880,891 teaches the use of a horizontally mounted hard plastic element across the supporting frame with a convex surface oriented towards the line of impact of passenger head into the head restraint during rear impact. This document also claims that the use of the inner core plastic allow the reduction of surface foam which is part of the cause of head deflection because of the softness of the surface foam. Therefore, this document teaches the use of the inner plastic and simultaneously reducing surface foam thickness as a means to control head deflection.

Similarly, Japanese patent documents 2006/06823 and 2006/69286 also teach the use an inner core of hard substance to increase load bearing property of the head restraint utilizing a support frame to secure the location of the hard inner core. In these cases, it is also taught to substitute a lower ball rebound foam (25% ball rebound) for the surface foam as a means to improve the softness feel of the head restraint. These documents also specified the thickness of the low ball rebound foam to be within 20-40 mm These designs suffer from a number of disadvantages.

The approach taught by U.S. Pat. 6,880,891 actually reduces surface foam thickness which can result in an increased likelihood of injury to the occupant. Further, this approach require the use of a hard plastic insert thereby complicating manufacture of the vehicular headrest and increasing the cost thereof.

The approach taught by Japanese patent documents 2006/06823 and 2006/69286 requires substitution of a lower ball rebound foam thereby complicating manufacture of the vehicular headrest and increasing the cost thereof.

In addition, these prior art approaches do not result in a headrest that is consistently compliant with the FMVSS 202a backset retention requirement.

Accordingly, it would be desirable to have a vehicular headrest that overcomes one or more of the above-mentioned disadvantages.

SUMMARY OF THE INVENTION

It is an object of the present invention to obviate or mitigate at least one of the above-mentioned disadvantages of the prior art.

It is another object of the present invention to provide a novel vehicular seat system.

It is another aspect of the present invention to provide a novel vehicular headrest.

Accordingly, in one of its aspects, the present invention provides a vehicular seat system comprising a seat bottom, a seat back and headrest connected to the seat back, the headrest comprising:

a non-foam frame element;

a non-foam insert secured with respect to a portion of the frame element; and a resilient element in which at least a portion of the frame element and the entire insert are embedded, the resilient element consisting essentially of a homogeneous foam material;

wherein:

(i) the frame element comprises a pair of post elements for coupling to the vehicular seat back, the post elements being interconnected by a cross-piece element; and (ii) the minimum distance between the outer surface of the headrest for contacting a head of an occupant and the insert is in the range of from about 10 mm to about 30 mm.

In another of its aspects, the present invention provides a vehicular headrest comprising:

a non-foam frame element;

a non-foam insert secured with respect to a portion of the frame element; and a resilient element in which at least a portion of the frame element and the entire insert are embedded, the resilient element consisting essentially of a homogeneous foam material;

wherein: (i) the frame element comprises a pair of post elements for coupling to a vehicular seat back, the post elements being interconnected by a cross-piece element, and (ii) the insert is free of enclosed cavities.

Thus, the present inventors have developed a novel vehicular seat system and a novel vehicular headrest.

The aspect of the invention that relates to a vehicular seat system includes a seat bottom and a seat back. The headrest is connected to the seat back. The headrest consists of a number of components. These components include: a non-foam frame element, a non-foam insert secured with respect to a portion of the frame element, and a resilient element in which at least a portion of the frame element and the entire insert are embedded. The resilient element consists essentially of a homogeneous foam material. The frame element comprises a pair of post elements for coupling to the vehicular seat back. The post elements are interconnected by a cross-piece element. The headrest is connected to the seat back such that the minimum distance between the outer surface of the headrest for contacting a head of an occupant and the insert is in the range of from about 10 mm to about 30 mm.

This aspect of the present invention relates to a vehicular seat system incorporates a vehicular headrest which, on the one hand, is of simplified construction while, on the other hand, is able to be compliant with the FMVSS 202a back set retention requirement. This is achieved without the need to use rigid foam inserts and/or hard plastic shells (i.e., containing a cavity) in the core region of the headrest.

The aspect of the invention that relates to a vehicular headrest comprises the following components: a non-foam frame element, a non-foam insert secured with respect to a portion of the frame element, and a resilient element in which at least a portion of the frame element and the entire insert are embedded. The resilient element consists essentially of a homogeneous foam. The frame element comprises a pair of post elements for coupling to a vehicular seat back. The post elements are interconnected by a cross-piece element and the insert is free of enclosed cavities.

In a highly preferred embodiment, the non-foam insert is contoured so that it can be snapped onto the frame element as a one piece unit. This greatly facilitates shipping of the inserts to the place of manufacture of the headrest and also facilitates manufacturing of the headrest from the view point of manufacturing efficiencies. Preferably, the insert is made from a thermoformable material to avoid conventional, relatively expensive injection molding techniques. The use of a thermoforming technique to produce the insert used in the present seat system and headrest is advantageous as it requires relatively low cost tooling and the process is more efficient than producing inserts made from urethane or expanded polypropylene (EPP) molding techniques. Thus, the insert used in the present vehicular headrest is designed to be stacked easily, which results in highly efficient utilization of packages for shipping. In contrast, the use of urethane or EPP inserts require significant volume and these materials do not package efficiently. Injection molded plastic parts typically include ribs and do not stack efficiently.

As will be described in more detail below, the preferred design of the frame element is optimized to minimize the material required for the insert.

A particular advantage of the present vehicular headrest is that it provides structural rigidity while also providing elastic response when a load is removed thereby reducing the residual deflection in the foam.

In a further preferred embodiment, the frame element and the insert are designed in a substantially complementary fashion so that the insert can only be secured to the frame element in the correct manner.

The use of a relatively thin insert in the present vehicular headrest results in a per piece cost that is relatively low compared to the use of EPP (cost reduced by 50%) or urethane (cost reduced by 67%).

In a further preferred embodiment of the vehicular headrest, the region of the frame (i.e., the cross-piece element) embedded in the resilient material (e.g., foam) comprises a lateral section thereby increasing the overall length of the cross-piece element with respect to the distance between the opposed post elements from the frame element. This results in integration of the load bearing structure on the supporting frame without the requirement to use an additional loading bearing inner core material such as EPP foam.

In another preferred embodiment, the shaped cross-piece section is also angled near or to the specific line of projected impact to maximize the load bearing force that can be absorbed by the headrest. Unlike the prior art approaches, the surface thickness of the resilient element of the headrest is not reduced (by incorporation of a bulky core material made of relatively foam or hard plastic) to further restrict deflection. Rather, the present vehicular headrest allows for varying foam properties of the resilient element to improve control of deflection of the occupant's head on impact. The use of foam properties to control deflection in this manner allows for the production of an improved loading bearing device which is not taught or suggested by the prior art references mentioned above.

The present inventors have discovered that the overall deflection of the head restraint (the portion of the headrest impacted by the occupant) is the sum effect of the stiffness of the load bearing substrate, the thickness of the surface foam and the hardness of the surface foam. In the present vehicular headrest, a harder, less bulky inner substrate can be used thereby allowing a thicker and softer resilient element. Similarly, in other embodiments, a softer load bearing substrate can be used with thinner and harder surface foams without compromising the overall head deflection on rear impact.

This approach obviates the need for using low ball rebound foams at specific thicknesses as taught in the prior art mentioned above. This allows for flexibility in design and in the choice of material for the inner core of the vehicular headrest for whiplash applications.

Other advantages will of course be apparent to those of skill in the art upon reviewing the present specification.

BRIEF DESCRIPTION OF THE DRAWINGS

Embodiments of the present invention will be described with reference to the accompanying drawings, wherein like reference numerals denote like parts, and in which:

FIG. 3 is a sectional view taken along line B-B in FIG. 2;

FIG. 4 is a side view of the vehicular headrest shown in FIG. 1;

DETAILED DESCRIPTION OF THE PREFERRED EMBODIMENTS

Figure 1:
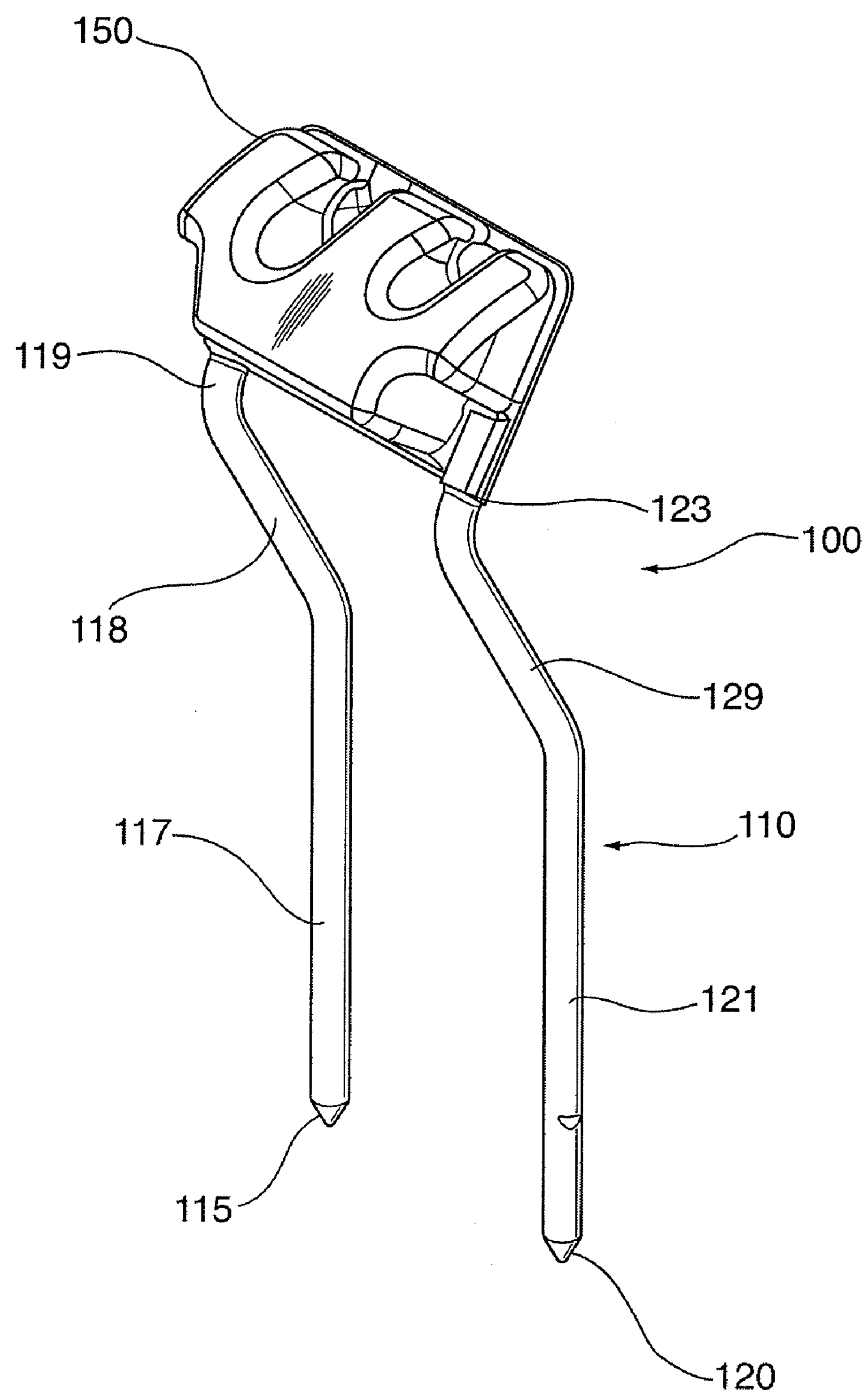
FIG. 1 illustrates a perspective view of a preferred embodiment of the present vehicular headrest.
Figure 2:
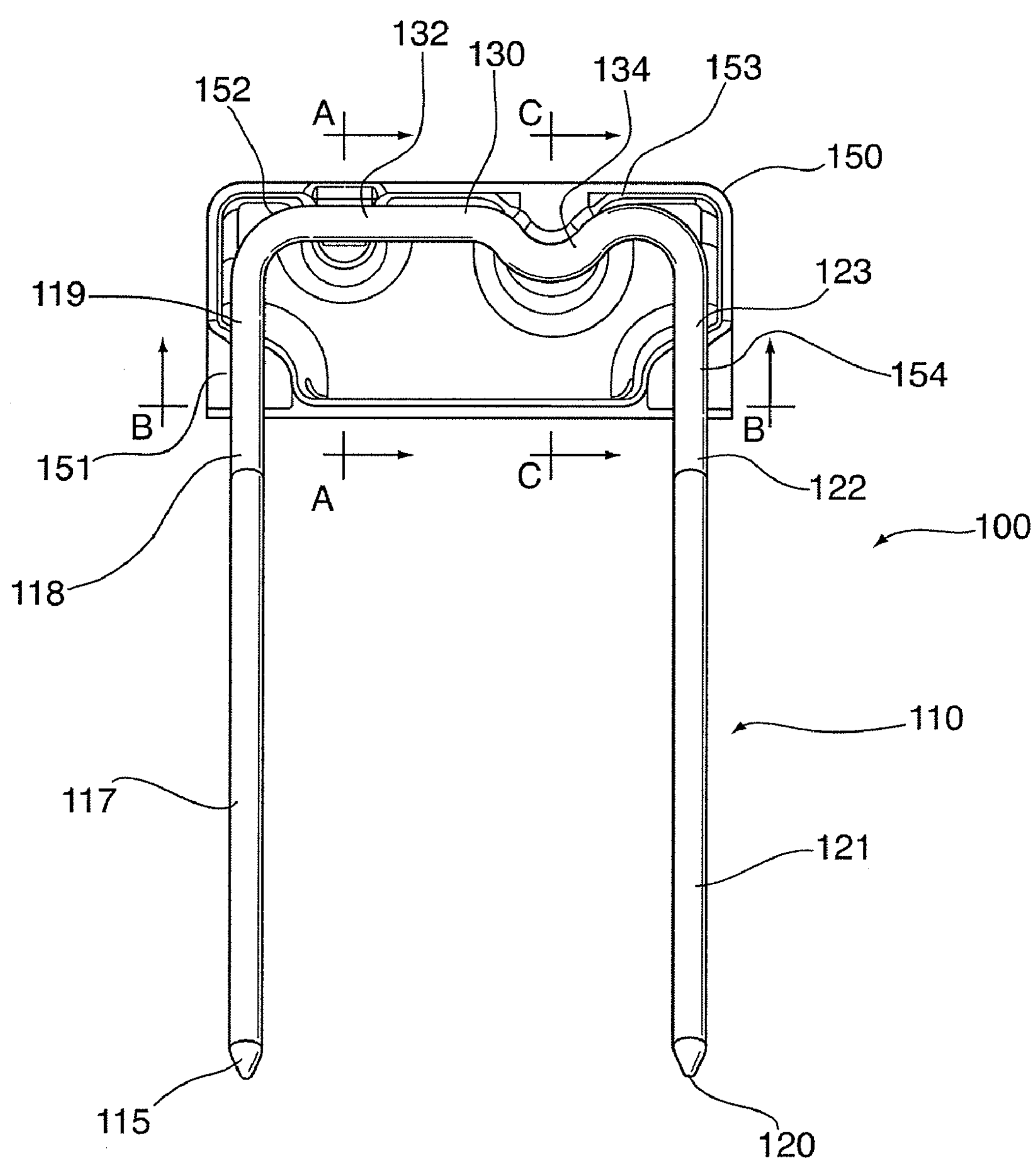
FIG. 2 illustrates a front view of the vehicular headrest shown in FIG. 1.
Figure 5:
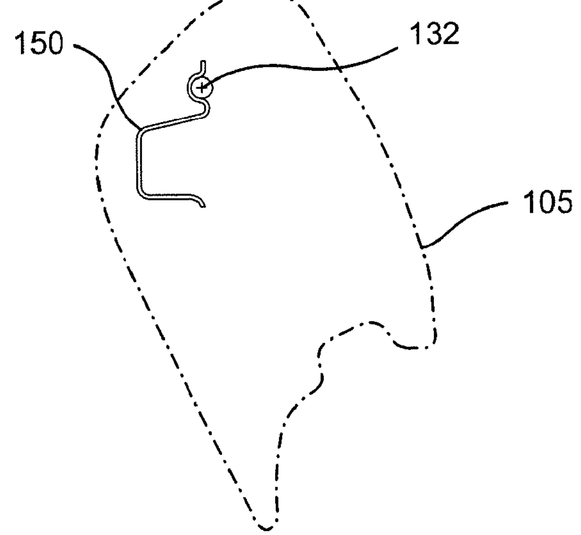
FIG. 5 is a sectional view along line A-A in FIG. 2.
Figure 6:
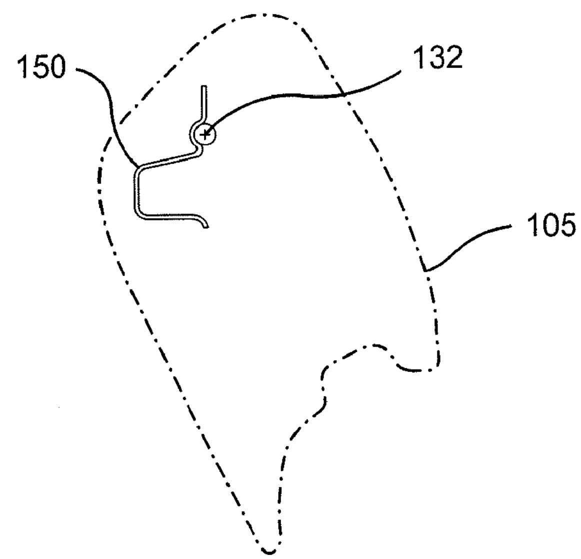
FIG. 6 is sectional view along line C-C in FIG. 2.

With reference to FIGS. 1-6, there is illustrated a vehicular headrest 100. Vehicular headrest 100 includes a resilient element 105 (for clarity in ghosted outline form only in FIGS. 3-6).

Headrest 100 further comprises a frame element 110. Frame element 110 consists of a pair of post elements 115, 120 that are interconnected by a cross-piece element 130. Post element 115 consists of a first post portion 117, a second post portion 118 and a third post portion 119. Post element 120 consists of a first post portion 121, a second post portion 122 and a third post portion 123.

Cross-piece element 130 consists of a first straight portion 132 and a lateral portion 134. Lateral portion 134 is generally in the form of a C-shaped but other shapes such as a U-shaped and an undulating shape (e.g., and S-shape) can also be used.

An insert element 150 is attached to post portions 119,123 and cross-piece 130. Insert element 150 comprises receptacles 151,152,153,154. As shown, receptacle 151 receives a portion of post portion 119, receptacle 152 receives a portion of straight piece 132, receptacle 153 receives lateral portion 134 and receptacle 154 receives post portion 123. In essence, receptacles 151,152,154 serve to allow insert portion 150 to be snapped onto the upper portion of frame element 110.

As will be seen, lateral portion 134 is offset with respect to the mid-point between post elements 115,120. This is an advantageous feature of the present vehicular headset in that it allows for a single, correct orientation of insert element 150 with respect to frame element 110.

Preferably, lateral section 134 is encompassed by an imaginary sphere having a diameter in the range of from about 15 mm to about 200 mm, more preferably in the range of from about 25 mm to about 175 mm, most preferably in the range from about 50 mm to 150 mm.

As shown, particularly in FIGS. 1 and 4, first post portion 117 is angled with respect to second post portion 118 and first post portion 121 is similarly angled with respect to second post portion 122. In each case, the angle is an obtuse angle. Preferably, the angle is the range of from about 90° to about 170°, more preferably in the range of from about 95° to about 165°, most preferably in the range of from about 100° to about 160°.

With further reference to FIGS. 1 and 4, second post portion 118 is angled with respect to third post portion 119 and second post portion 122 is similarly angled with respect to third post portion 123. While this angle may be acute or obtuse, it is preferred that the angle be obtuse—e.g., in the range of from about 90° to about 170°, more preferably from about 90° to about 155° falls preferably from about 90° to about 140°. Cross-piece element 130 may be mechanically fastened to post elements 115,120 or it may be integrally formed with post elements 115,120.

As shown in FIGS. 1-6, insert element 150 is free of enclosed cavities. Preferably, insert element 150 is constructed from a polymer such as a thermoplastic material. More preferably, insert element 150 is constructed from a material selected from the group consisting of polyethylene (including high density polyethylene—also known as HDPE), polypropylene, a copolymer of ethylene and an α-olefin, polystryrene, Nylon 6, Nylon 6/6, acrylonitrile-butadiene-styrene (ABS) copolymer, polycarbonate and thermoplastic olefin (TPO). The most preferred material for construction of insert element 150 is polystyrene.

Preferably, insert element 150 has a thickness in the range of from about 0.3 mm to about 3.0 mm, more preferably from about 1.3 mm to about 1.7 mm. As shown, it is preferred that insert element 150 be appropriately contoured to include receptacles coupling the various portions of frame element 110. This can be achieved, for example, by applying thermoforming techniques to a relatively planer starting blank for producing insert element 150.

Preferably, the homogeneous foam material in which insert element 150 in a portion of frame element 110 are embedded has a prescribed compression force deflection at 50% when measured pursuant to ASTM D3574-05. Specifically, it is preferred that this property of the homogeneous foam material be in the range of from about 20 N to about 90 N, more preferably from about 30 N to about 75 N, most preferably from about 35 N to about 60 N. Preferably, this foam material is an isocyanate-based polymer foam, most preferably the homogeneous foam material is polyurethane.

When the homogeneous foam material is polyurethane, it is preferred that it have a density in the range of from about 30 to about 80 kg/m$^3$, most preferably from about 45 to about 65 kg/m$^3$, most preferably from about 55 to about 60 kg/m$^3$.

Generally, the polyurethane foam suitable for use in the present vehicular headrest and having desirable characteristics may be produced from the following general non-limiting formulation:

| Component | Amount |
|---|---|
| Polymer Polyol | 100-0 parts |
| Polyol | 0-100 parts |
| Crosslinker | 0-30 parts/100 parts total polyol |
| Catalyst | 0.05 to 3.5 parts/100 parts total polyol |
| Silicone Surfactants | 0-1.5 parts/100 parts total polyol |
| $H_2O$ | 0.5 to 25 parts/100 parts total polyol |
| Isocyanate | Adequate quantity for an index of from about 0.60 to 1.30 ratio of NCO equivalents to the equivalents of NCO reactive sites. |

The preferred polyurethane foam suitable for use in the present vehicular headrest may be produced from the following formulation:

| Component | Amount |
|---|---|
| Polymer Polyol | 0-30 parts |
| Polyol | 70-100 parts |
| Crosslinker | 5-15 parts/100 parts total polyol |
| Catalyst | 0.5-1.2 parts/100 parts total polyol |
| Silicone Surfactants | 0.3-1.1 parts/100 parts total polyol |
| $H_2O$ | 1.75-2.75 parts/100 parts total polyol |
| Isocyanate | Adequate quantity for an index of from about 0.7 to 1.1 ratio of NCO equivalents to the equivalents of NCO reactive sites. |

Figure 7:
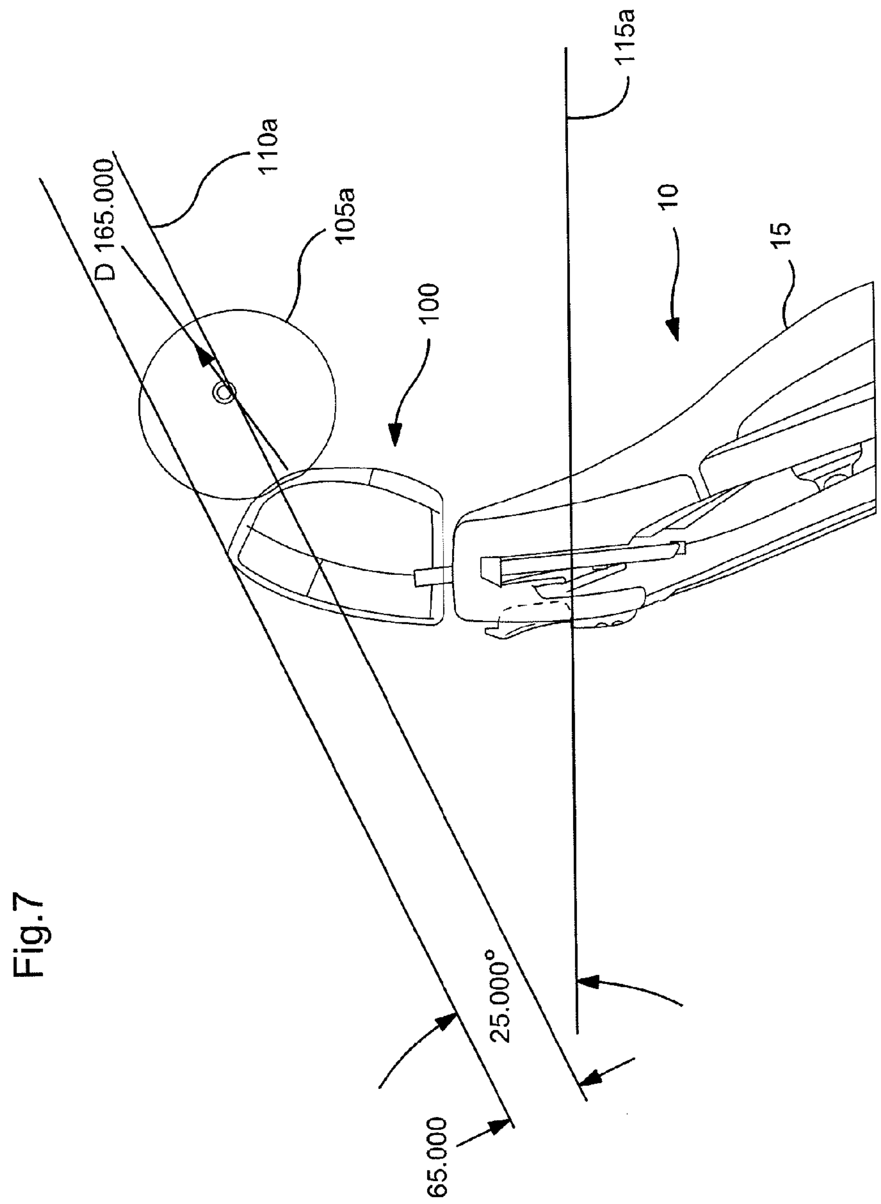
FIG. 7 illustrates a side view of a preferred embodiment of the present vehicular seat system.

With reference to FIG. 7, there is illustrated a portion of a vehicular seat 10. Vehicular seat 10 comprises a seat back 15 and a seat bottom (not shown) connected to seat back 15. Disposed in a top portion of seat back 15 is seat headrest 100.

As shown, headrest 100 is oriented in a specific manner. In this context, an imaginary head 105 of an occupant is shown to be in contact with outer surface of headrest 100. A line **110*a* is drawn through the center of head 105*a* and contains the minimum distance between the outer surface of headrest 100 and insert 105 (not shown) of headrest 100**. Preferably, the minimum distance between the outer surface of the headrest for contacting a head of an occupant and the insert is in the range of from about 10 mm to about 30 mm, more preferably from about 15 mm to about 25 mm, most preferably from about 15 mm to about 20 mm.

Line **110*a* is disposed at an angle of 25° (the angle is typically in the range of 20° to 25°) with respect to a second line 115*a* that is coplanar with line 110 and a plane perpendicular to a center line section between the posts of headrest 110 (this latter plane would be a plane coming out of FIG. 7 directly from line 115). This determines the correct orientation of first post portion 118 and third post portion 119**.

This orientation of headrest 110 as described above results in significantly improved performance of headrest 110, included compliance with the FMVSS 202a back set retention requirement.

Figure 8:
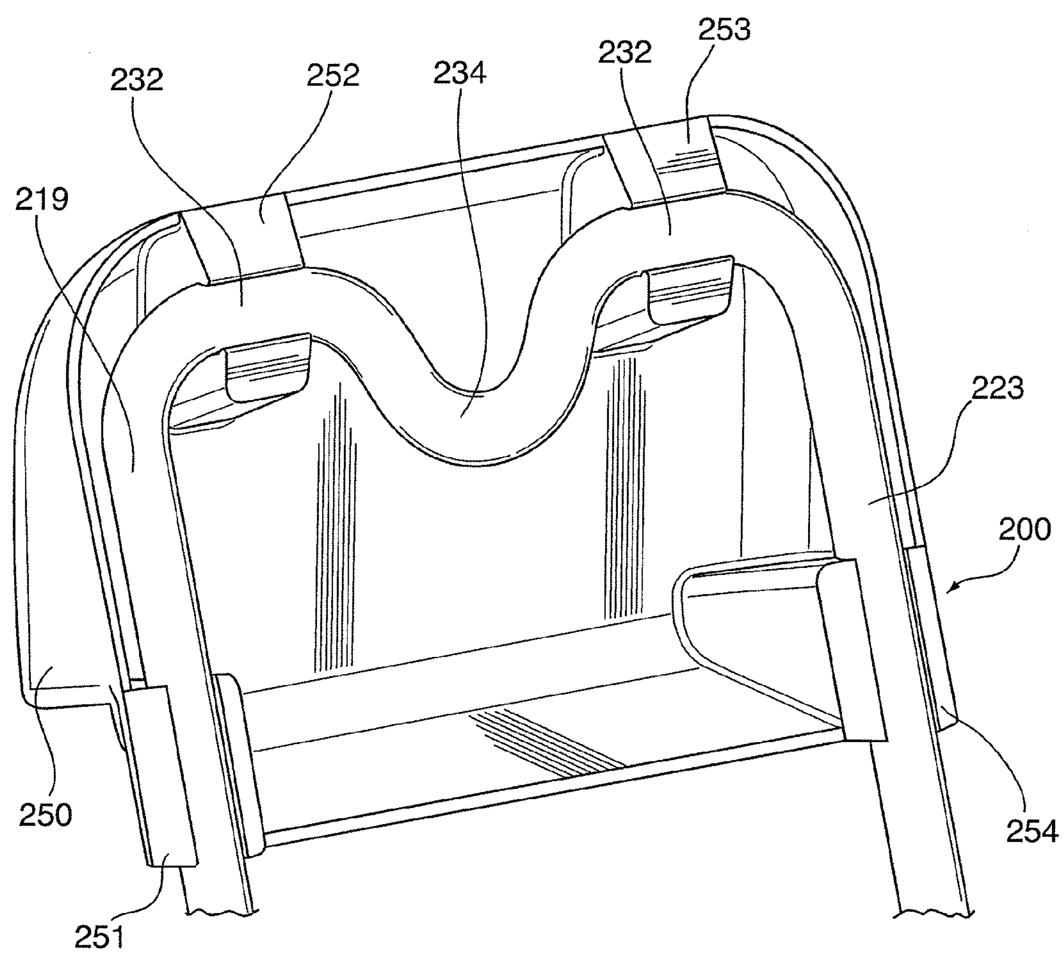
FIG. 8 is a partial perspective view of a second embodiment of the present vehicular headrest without the resilient element (for clarity)
Figure 9:
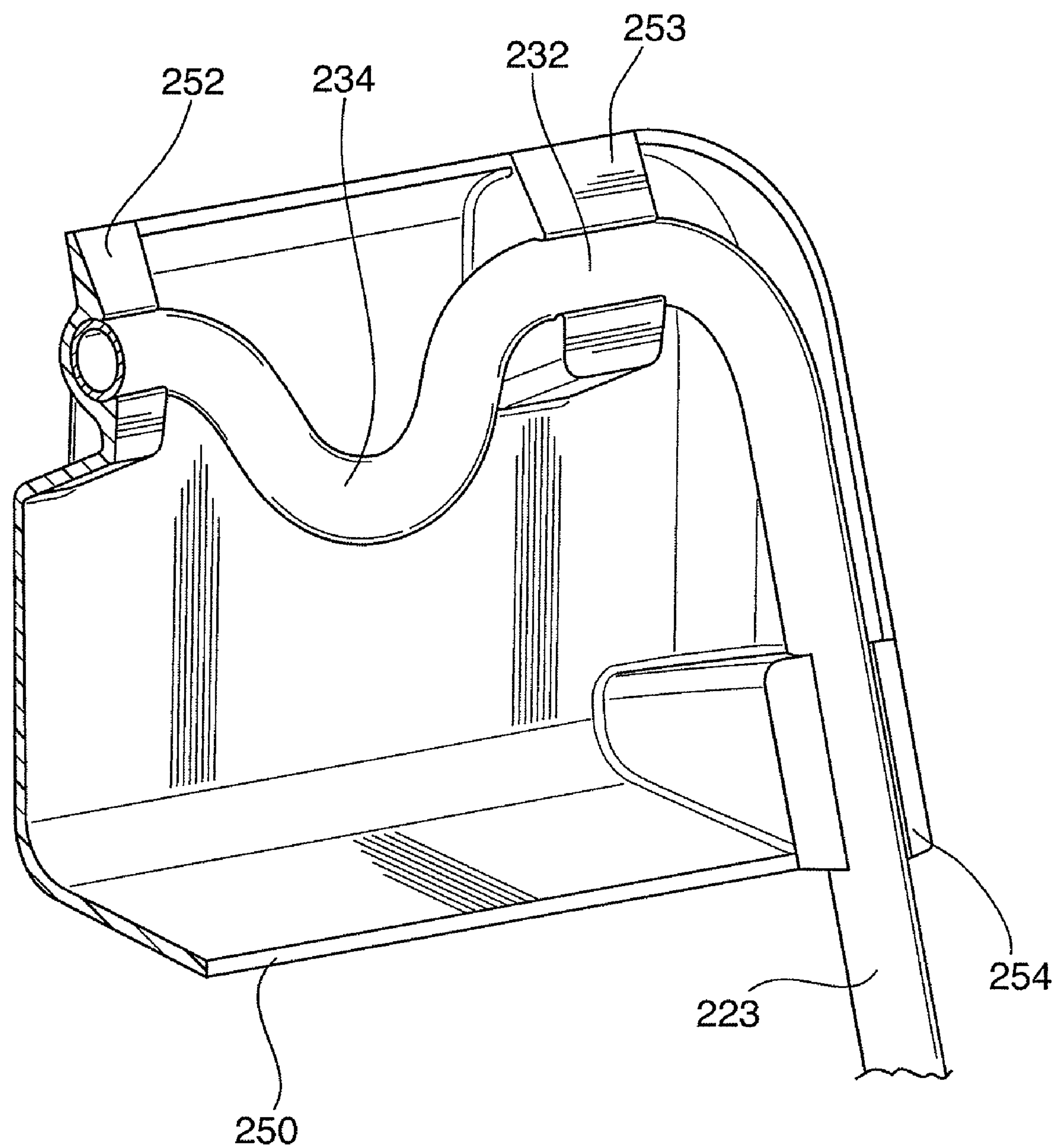
FIG. 9 is similar to FIG. 8 but with a portion cut away.
Figure 10:
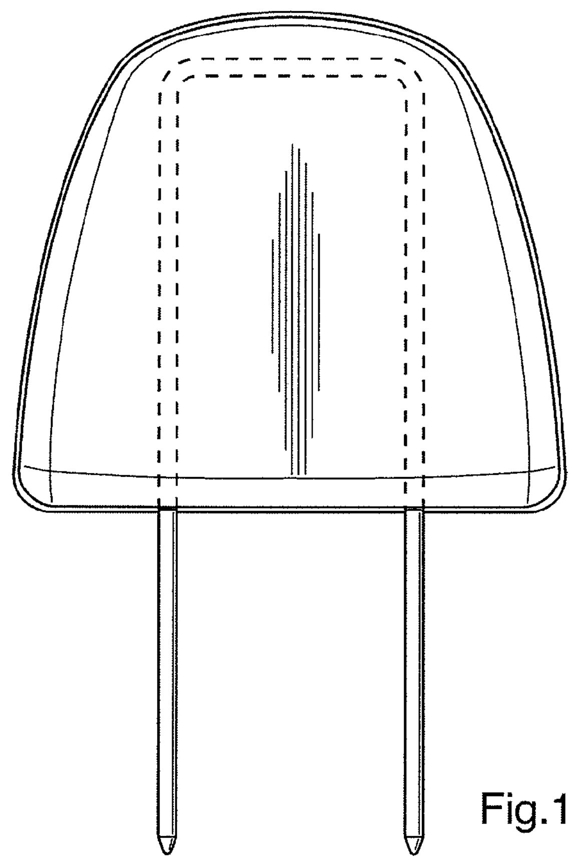
FIGS. 10 and 11 illustrate front and side views, respectively, of third embodiment of the present vehicular headrest without the insert element (for clarity)
Figure 11:
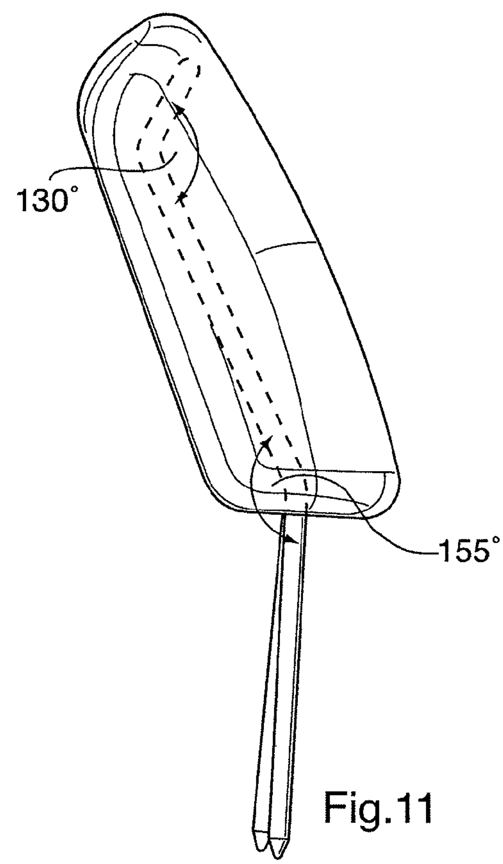
Figure 12:
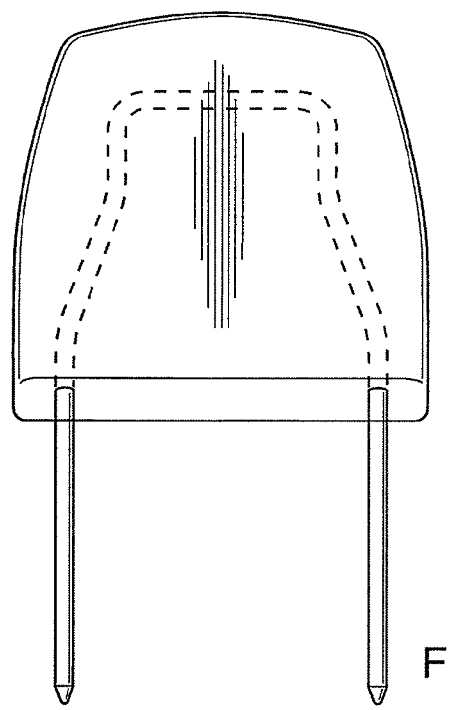
FIGS. 12 and 13 illustrate front and side views, respectively, of a fourth embodiment of the present vehicular headrest without the insert element (for clarity)
Figure 13:
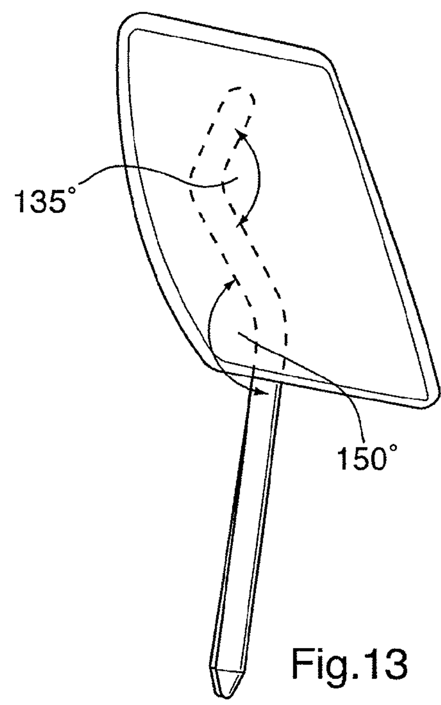

FIGS. 8 and 9 illustrate portions of an alternate embodiment of a vehicular headrest 200 in which elements similar to those discussed above with respect to headrest 100 have the same two last digits. The principle difference in this embodiment is that lateral section 234 of the cross-piece element is located at a midpoint between post portions 219,223. This embodiment is less preferred than the one described above with reference to FIGS. 1-7 since there is the possibility that insert element 250 can be placed on the wrong side of the frame element in the situation where the frame element contains angled portions as shown in the embodiment discussed in connection with FIGS. 1-6. This embodiment can be readily implemented, for example, if the frame element that dose not contain such bends or by ensuring that the worker knows the correct relative orientation of the frame element and the insert element.

FIGS. 10-13 illustrate alternate embodiments in the design of the frame element embedded in the resilient element. For clarity purposes, the insert element has not been shown. These embodiments show how the frame element and the shape of the resilient element can be modified.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A vehicular seat system comprising a seat bottom, a seat back and headrest connected to the seat back, the headrest comprising:

a non-foam frame element;

a non-foam insert secured with respect to a portion of the frame element; and a resilient element in which at least a portion of the frame element and the entire insert are embedded, the resilient element consisting essentially of a homogeneous foam material;

wherein:

(i) the frame element comprises a pair of post elements for coupling to a vehicular seatback, the post elements being interconnected by a cross-piece element that is coupled to a top portion of the insert such that the cross-piece element is disposed closer to the top of the insert than the bottom of the insert; and (ii) a minimum distance between the outer surface of the headrest for contacting a head of an occupant and the insert is in the range of from about 10 mm to about 30 mm.

2. The vehicular seat defined in claim 1, wherein the minimum distance between the outer surface of the headrest and the insert is in the range of from about 15 mm to about 25 mm.

3. The vehicular seat defined in claim 1, wherein the homogeneous foam material has a compression force deflection at 50% when measured pursuant to ASTM D3574-05 in the range of from about 30 N to about 75 N.

4. The vehicular seat defined in claim 1, wherein the cross-piece element is fastened to the post elements.

5. The vehicular seat defined in claim 1, wherein the insert is cavity-free.

6. The vehicular seat defined in claim 1, wherein the insert is constructed from a polymer.

7. The vehicular seat defined in claim 1, wherein the insert has a thickness in the range of from about 0.3 to about 3.0 mm.

8. The vehicular seat defined in claim 1, wherein the homogeneous foam material is polyurethane.

9. The vehicular seat defined in claim 8, wherein the polyurethane has a density in the range of from about 30 kg/m$^3$ to about 80 kg/m$^3$.

10. The vehicular seat defined in claim 1, wherein the minimum distance is comprised in a center line section between the posts of the headrest.

11. The vehicular seat defined in claim 10, wherein the minimum distance is comprised in a first line contained in the center line section, the first line disposed at an angle in the range of from about 10° to about 40° with respect to a second line that is coplanar with the first line and a plane perpendicular to the center line section.

12. The vehicular seat defined in claim 1, wherein the insert comprises a contoured configuration.

13. The vehicular seat defined in claim 12, wherein the contoured configuration comprises an A-surface configured to face the head of a vehicle occupant and a B-surface configured to face the frame element.

14. The vehicular seat defined in claim 13, wherein the B-surface comprises at least one receptacle portion for receiving a portion of the frame element.

15. The vehicular seat defined in claim 13, wherein the B-surface comprises a first post receptacle portion for receiving a portion of one of the post elements and a second post receptacle portion for receiving a portion of the other of the post elements.

16. The vehicular seat defined in claim 13, wherein the B-surface comprises at least one post receptacle portion for receiving a portion of at least one of the post elements.

17. The vehicular seat defined in claim 16, wherein the B-surface comprises at least one cross-piece receptacle portion for receiving a portion of the cross-piece element.

18. The vehicular seat defined in claim 16, wherein the B-surface comprises a first cross-piece receptacle portion for receiving a first portion of the cross-piece element and a second cross-piece receptacle portion for receiving a second portion of the cross-piece element.

19. The vehicular seat defined in claim 1, wherein the cross-piece element comprises a length greater than a distance between the post elements.

20. The vehicular seat defined in claim 19, wherein the cross-piece element comprises a central portion interposed between a pair of connecting portions, each connecting portion connected to a post.

21. The vehicular seat defined in claim 20, wherein the central portion comprises a U-shape.

22. The vehicular seat defined in claim 20, wherein the central portion comprises a C-shape.

23. The vehicular seat defined in claim 20, wherein the central portion comprises an undulating shape.

24. The vehicular seat defined in claim 20, wherein the central portion is offset with respect to an axis midpoint between the post elements.

25. The vehicular seat defined in claim 20, wherein the central portion is aligned with respect to an axis midpoint between the post elements.

26. The vehicular seat defined in claim 20, wherein the central portion is configured to be encompassed by a sphere having a diameter in the range of from about 15 mm to about 200 mm.

27. The vehicular seat defined in claim 1, wherein each post element comprises a first straight portion connected to a second straight portion.

28. The vehicular seat defined in claim 27, wherein the first straight portion is connected to the second straight portion at a first obtuse angle.

29. The vehicular seat defined in claim 27, wherein each post element further comprises a third straight portion connected to the second straight portion.

30. The vehicular seat defined in claim 29, wherein the third straight portion is connected to the second straight portion at a second obtuse angle.

31. The vehicular seat defined in claim 29, wherein the third straight portion is connected to the second straight portion at an acute angle.

32. A vehicular seat system comprising a seat bottom, a seat back and headrest connected to the seat back, the headrest comprising:

a non-foam frame element;

a non-foam insert secured with respect to a portion of the frame element; and a resilient element in which at least a portion of the frame element and the entire insert are embedded, the resilient element consisting essentially of a homogeneous foam material;

wherein:

(i) the frame element comprises a pair of post elements for coupling to a vehicular seatback, the post elements being interconnected by a cross-piece element that is coupled to a top portion of the insert, wherein said cross-piece element has a non-symmetrical shape which is configured to mate with a complementary shape on the non-foam frame element disposed on only one side of the non-foam frame element; and (ii) a minimum distance between the outer surface of the headrest for contacting a head of an occupant and the insert is in the range of from about 10 mm to about 30 mm.

* * * * *